United States Patent [19]
Picotte

[11] Patent Number: 6,139,328
[45] Date of Patent: Oct. 31, 2000

[54] GRAPPLING DUMMY AND PRODUCTION THEREOF

[75] Inventor: Brett H. Picotte, Willard, Mo.

[73] Assignee: Brettco, Inc., Willard, Mo.

[21] Appl. No.: 09/105,753

[22] Filed: Jun. 26, 1998

Related U.S. Application Data

[60] Provisional application No. 60/051,050, Jun. 27, 1997.

[51] Int. Cl.[7] .............................. A63B 69/00; G09B 9/00; G09B 19/00
[52] U.S. Cl. ........................... 434/256; 434/247; 482/83; 482/86; 446/369; 446/371
[58] Field of Search ..................................... 434/247, 256; 273/55 A, 408; 482/83, 86; 446/336, 351, 359, 360, 361, 362, 368, 369, 371, 372, 385, 376, 379, 380, 381, 382, 383

[56] References Cited

U.S. PATENT DOCUMENTS

| | | |
|---|---|---|
| 724,822 | 4/1903 | Decker . |
| 958,387 | 5/1910 | Flynn . |
| 1,304,434 | 5/1919 | Wingert . |
| 1,336,898 | 4/1920 | Flynn . |
| 3,421,759 | 1/1969 | Chambers . |
| 3,789,547 | 2/1974 | Chermarin . |
| 4,235,025 | 11/1980 | Kortge ......................................... 35/17 |
| 4,276,032 | 6/1981 | Woley et al. ............................ 434/274 |
| 4,349,339 | 9/1982 | Daniel ..................................... 434/274 |
| 4,540,378 | 9/1985 | Cusimano ............................... 446/369 |
| 4,619,540 | 10/1986 | Day et al. ................................. 403/24 |
| 4,630,762 | 12/1986 | Stringer ..................................... 223/66 |
| 5,018,977 | 5/1991 | Wiley et al. ............................ 434/274 |
| 5,180,086 | 1/1993 | Ikeda ......................................... 223/66 |
| 5,281,191 | 1/1994 | DeSousa ..................................... 482/83 |
| 5,589,651 | 12/1996 | Viano et al. ............................ 73/866.4 |

OTHER PUBLICATIONS

"Karate International" Magazine, Jun./Jul. 1997, pp. 74–76 an article entitled "Dummy Training."

*Primary Examiner*—Sam Rimell
*Assistant Examiner*—Bena B. Miller
*Attorney, Agent, or Firm*—Jonathan A. Bay

[57] ABSTRACT

Disclosed is a grappling dummy is useful as a mock opponent for exercise or practice for athletes training for competitive martial art or wrestling purposes, as well as for practicing self-defense moves. The dummy is given a life size stature (for example, five foot ten inches or 178 cm), but a relatively diminutive weight:—e.g., about forty pounds or 18 kg for the given example. By giving the grappling dummy such a relatively diminutive weight, it happens to just "feel" right to the user who is practicing or exercising with the dummy. To preserve strength and toughness but conserve on weight, the dummy is produced substantially from soft materials including paper (as newspaper and computer paper, in some uses it is shredded, in others not), the plastic film of waste grocery sacks, burlap (in some uses in sack format, in others plain cloth), garden hose, braided nylon rope, poly strapping, cellophane tape, and duct tape. The sum total of hard elements can be limited to just eight pieces of pine 2×2's (eg., 5 cm on a side), and used just in the upper and lower arms and legs of the dummy. The dummy is entirely held together by lashing or knotting of the burlap or rope or poly strapping, or by either forms of the tape. The joints are "stiff" in the sense that a force must be applied sufficient to overcome their stiffness, but after the force falls off the joints "freeze" in place.

20 Claims, 8 Drawing Sheets

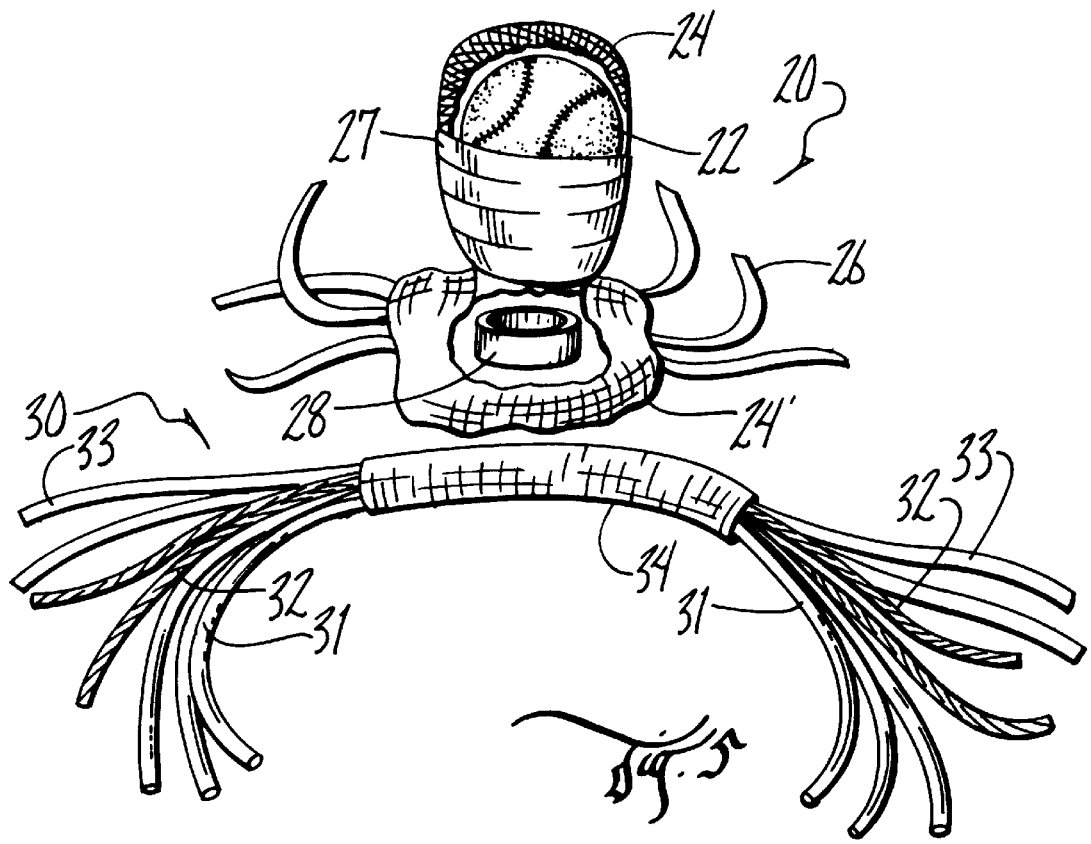
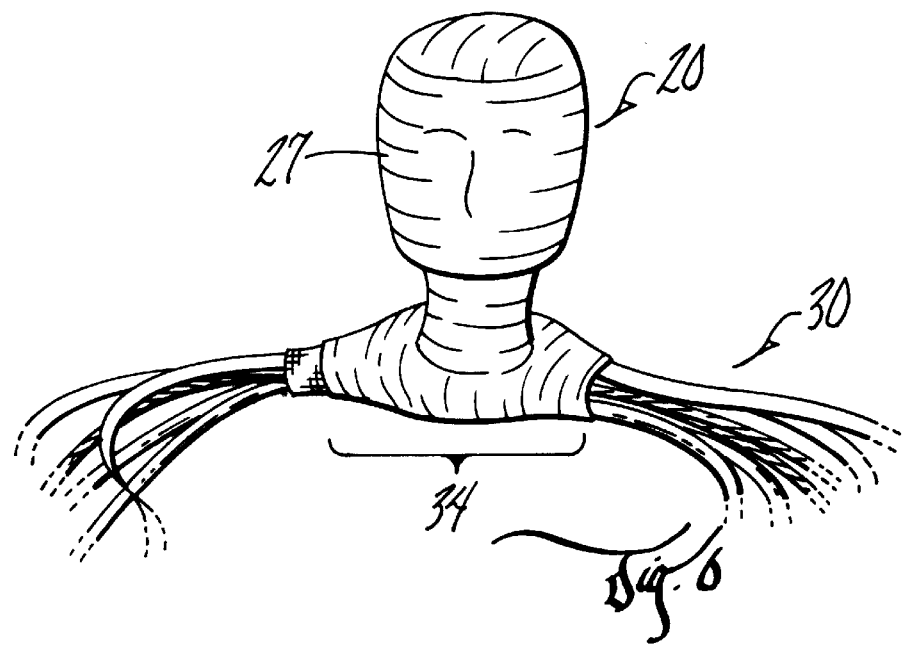

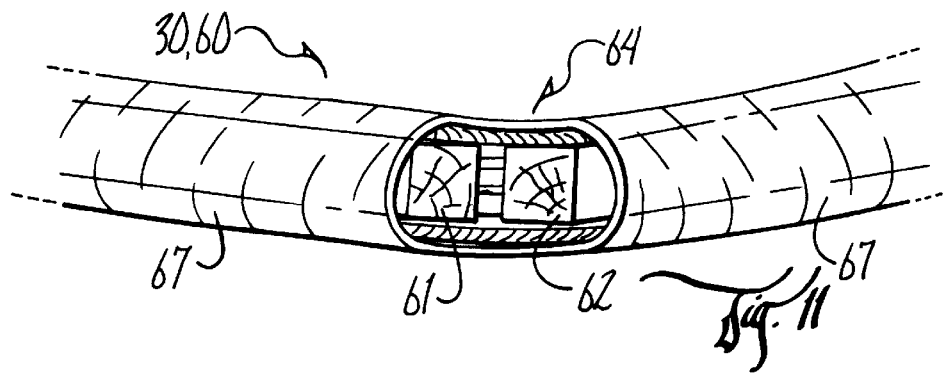
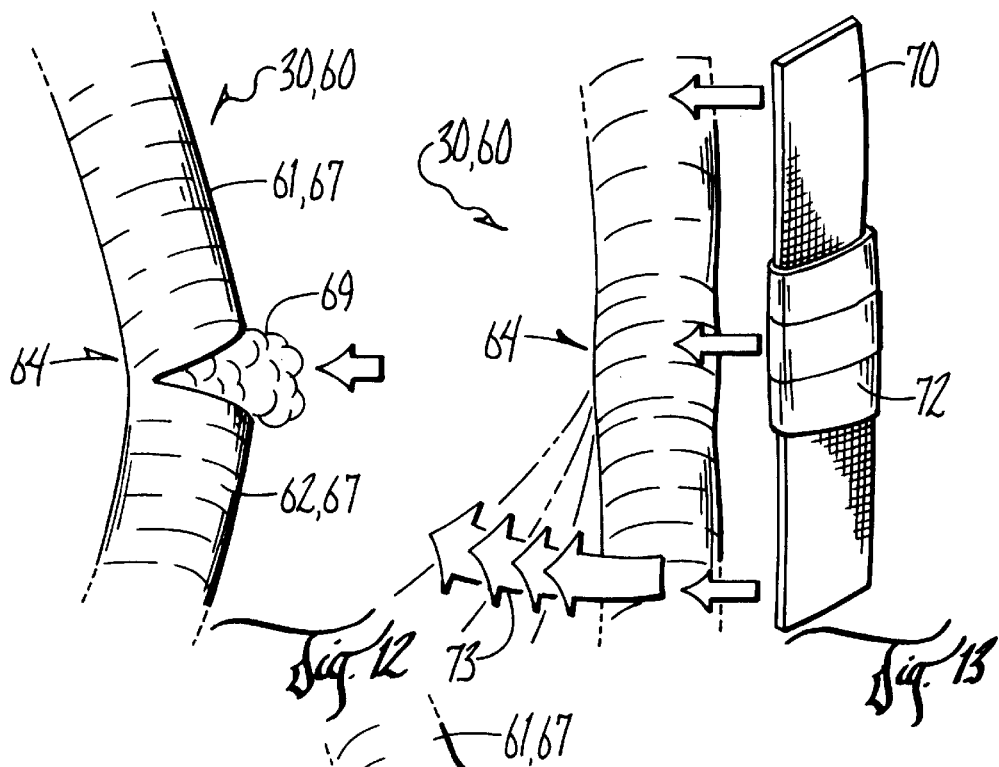
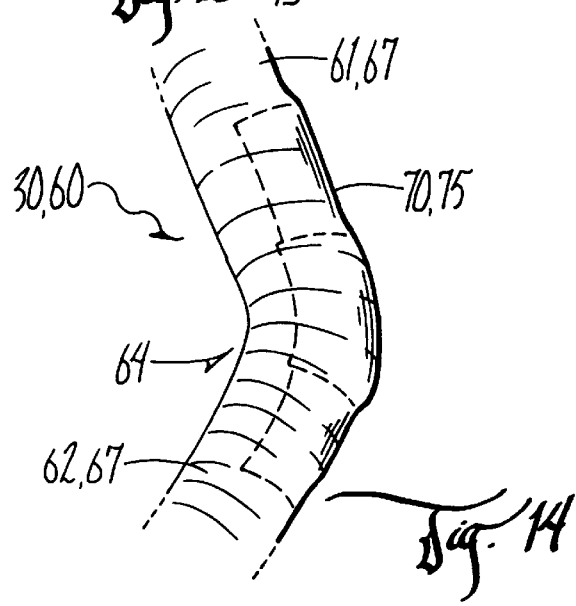

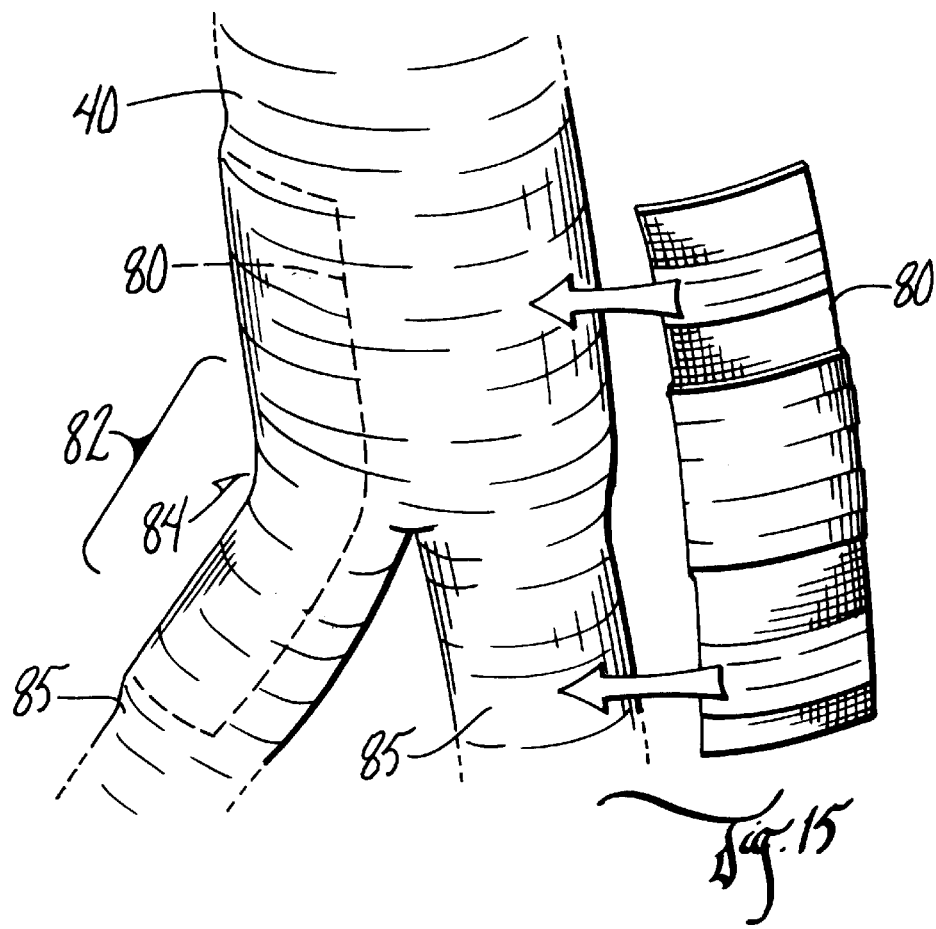
Fig. 15
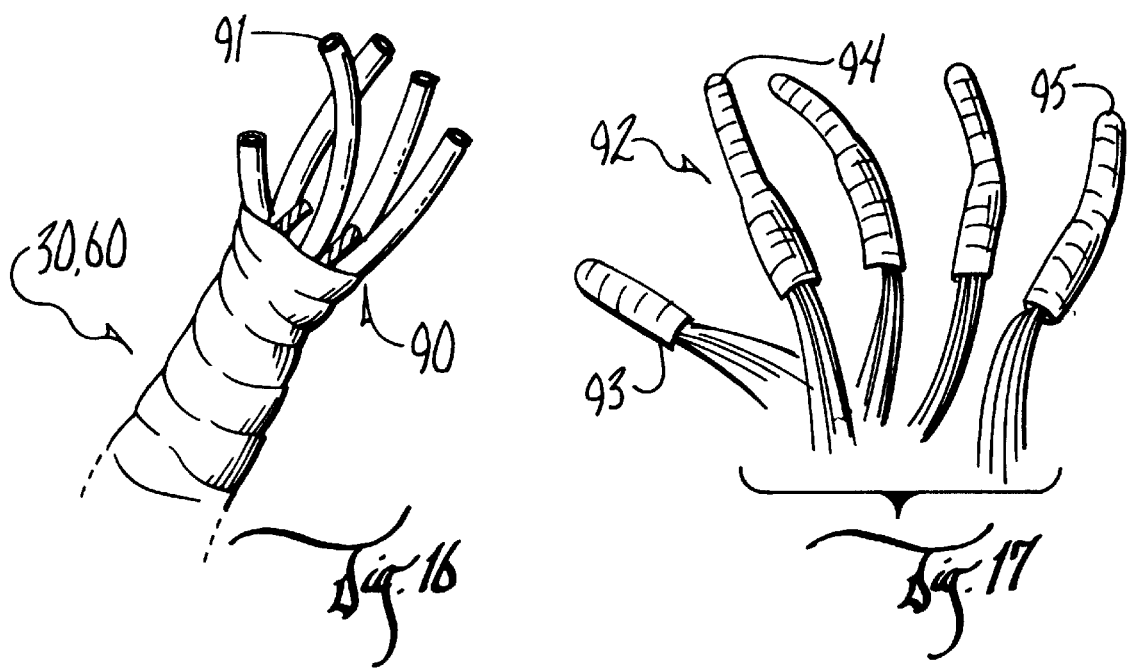
Fig. 16
Fig. 17

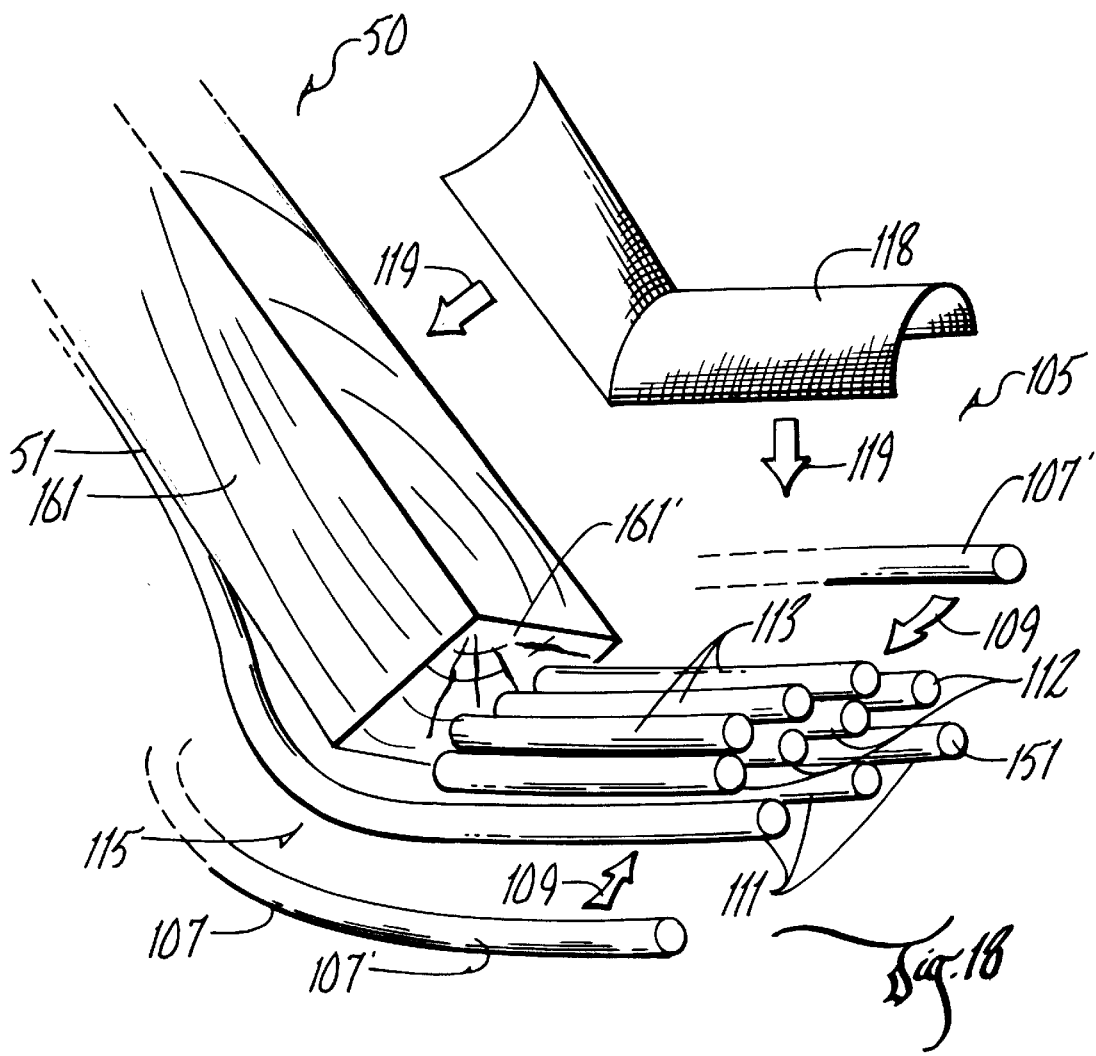

6,139,328

GRAPPLING DUMMY AND PRODUCTION THEREOF

CROSS-REFERENCE TO PROVISIONAL APPLICATION(s)

This application claims the benefit of U.S. Provisional Application No. 60/051,050, filed Jun. 27, 1997.

BACKGROUND AND SUMMARY OF THE INVENTION

The invention generally relates to a grappling dummy and a method of production of the inventive grappling dummy. The grappling dummy is useful for exercise or practice for athletes training for competitive martial art or wrestling purposes, as well as for practicing self-defense moves.

An inventive aspect of the grappling dummy is that, for a given stature, if it is given for example a stature of about five foot ten inches (178 cm) tall, then the weight of grappling dummy is correspondingly given a relatively diminutive weight:—e.g., somewhere in the neighborhood of forty pounds (18 kg) or so. It has been discovered that giving the grappling dummy such a relatively diminutive weight (relative to its stature) happens to just "feel" right to the user who is practicing or exercising with the dummy. In other words, whereas the grappling dummy is given a proportionate height for a practice opponent, it is given a grossly diminutive weight.

The dummy is produced from diverse materials and processes described more fully below. Some general aspects of the dummy and its production include that the elbows, knees, hips and ankles and so on preferably flex in natural directions while also limited from flexing in unnatural ways. The shoulder is given a full range of motion as appropriate.

A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 5 is a perspective view of production of the head of the dummy and a bi-lateral arm assembly, wherein layers of the head are partly peeled off to show the composition of the head;

FIG. 6 is a perspective view of the head joined to the bi-lateral arm assembly;

FIGS. 8 through 14 are a sequence of perspective views showing production of either a knee or an elbow joint, wherein:

FIG. 8 shows one each of a wooden upper and lower limb member resting aside the strands of filament materials that form the bi-lateral limb assemblies shown by any of FIGS. 5, 6 or 7;

FIG. 9 is a comparable view to FIG. 8 except that the wooden limb members have been enwrapped with the filament strands in a wrap of tape;

FIG. 10 is an enlarged scale perspective view of detail X in FIG. 9;

FIG. 11 is a reduced scale perspective view comparable to FIG. 9 except showing the tape wrap sliced open at the joint to allow retrieval of a pair of temporary shims, and the joint is resting flexed open;

FIG. 12 is a view comparable to FIG. 11 except showing the joint stuffed with wadded plastic film material which will limit unnatural hyper-extension of the joint;

FIG. 13 is a view comparable to FIG. 12 except showing application of a resistor to the joint to limit articulation of the joint substantially to flexion and extension only (eg., hinge movement) and give resistance to the flexion and extension of the joint within the imposed limits of flexion and extension;

FIG. 14 is a view comparable to FIG. 14 except showing the resistor secured by a wrap of tape;

FIG. 15 is a perspective view of the hip area of the dummy showing application of resistors to each hip to constrain the articulation of the hip substantially to flexion and extension only (eg., hinge movement), to limit unnatural hyper-extension of the hip joint, and to give resistance to the flexion and extension thereof within the imposed limits of extension and flexion;

FIG. 16 is a perspective view showing construction of a hand;

FIG. 17 is a comparable perspective view except showing an alternate version of a hand; and, FIG. 18 is a perspective view showing construction of a foot or, more particularly, the ankle.

DETAILED DESCRIPTION OF THE PREFERRED EMBODIMENTS

Figure 1:
FIG. 1 is a perspective view of a grappling dummy in accordance with the invention as shown in use for exercise as a mock opponent for a user to practice exercise routines, wherein the user is shown addressing the dummy in a side clinch stance.

FIG. 1 shows a grappling dummy 10 in accordance with the invention in use for exercise and practicing moves by a user of the dummy. The dummy 10 has a "skin" of duct tape, the outermost layer of which is wound around the form of the dummy as in a spiral "mummy" like wrap. The dummy 10 is "topless" and "barefoot" and is dressed only in hospital pants for modesty's sake as a form of exercise clothing.

In use, the grappling dummy 10 serves as a mock opponent for a user to practice his or her exercise routine. As shown in the view, the user is addressing the dummy 10 in a side clinch stance. The legs of the dummy 10 provide sufficient resistance to prop up not only the dummy 10 but also some fractional amount of the weight of the user, who is shown leaning onto the dummy.

Figure 2:
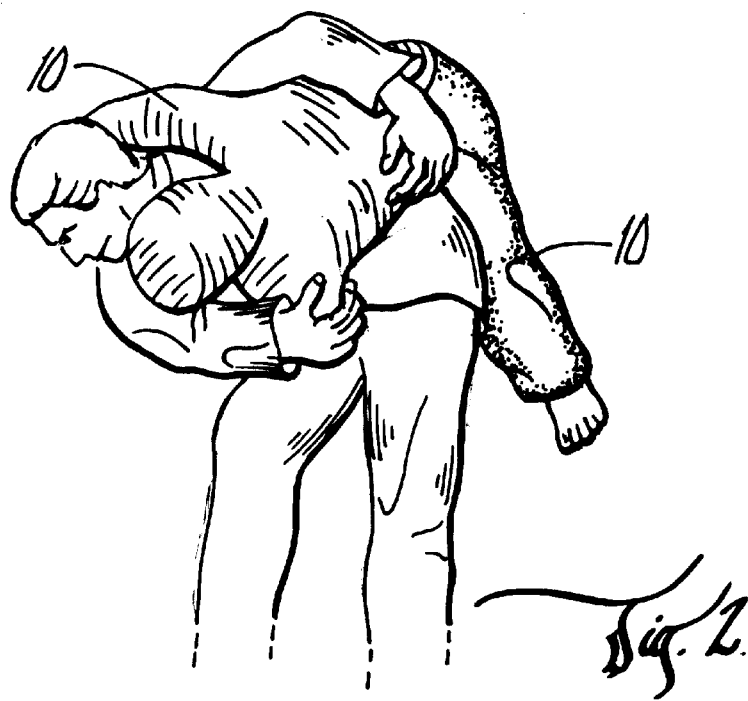
FIG. 2 is a perspective view comparable to FIG. 1 except that the user is executing a hip throw after having shifted from the side clinch position that FIG. 1 shows, and is at the stage where the dummy has been lifted off the ground.

FIG. 2 shows that the user practicing a hip throw which was initiated from the side clinch position shown by FIG. 1.

Figure 3:
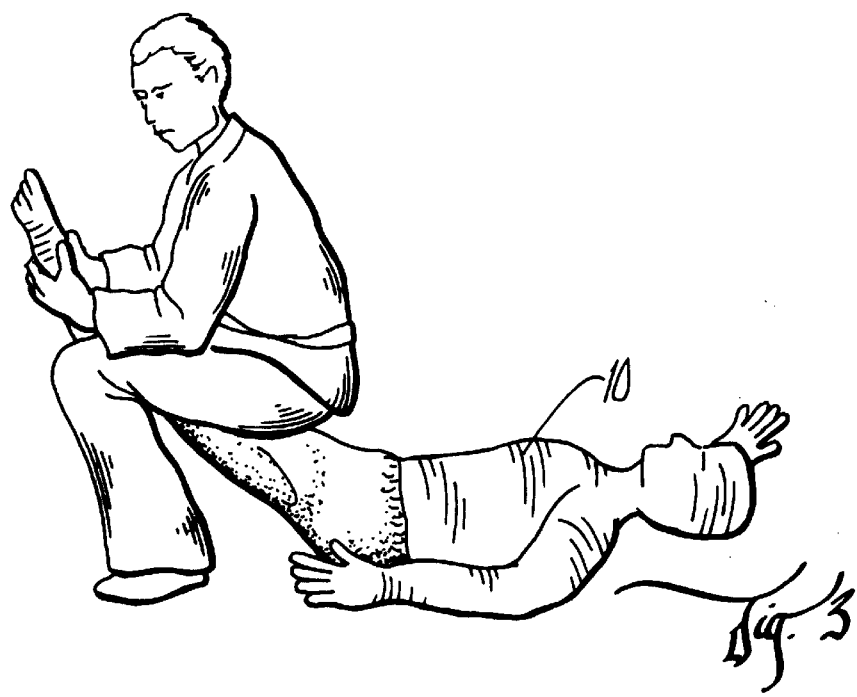
FIG. 3 is a perspective view of the user practicing a leg lock on the dummy.

FIG. 3 shows the user practicing a leg lock on the dummy 10. A leg lock like this tends to induce hyper-extension of the knee in an actual aggressor. The grappling dummy 10 in accordance with the invention, however, has an inventive knee construction which is sufficiently strong so that the knee will not extend past straight. Indeed, the dummy 10's knee joint is so strong that it will support the weight of the user as shown.

In fact, immediately after production of a dummy 10, it is tested for strength and readiness for market by, among other moves, the leg lock shown in FIG. 3. The dummy 10 must satisfactorily meet this test, as well as others, before it is passable for market. At least the elbows, among other joints, are tested similarly.

Figure 4:
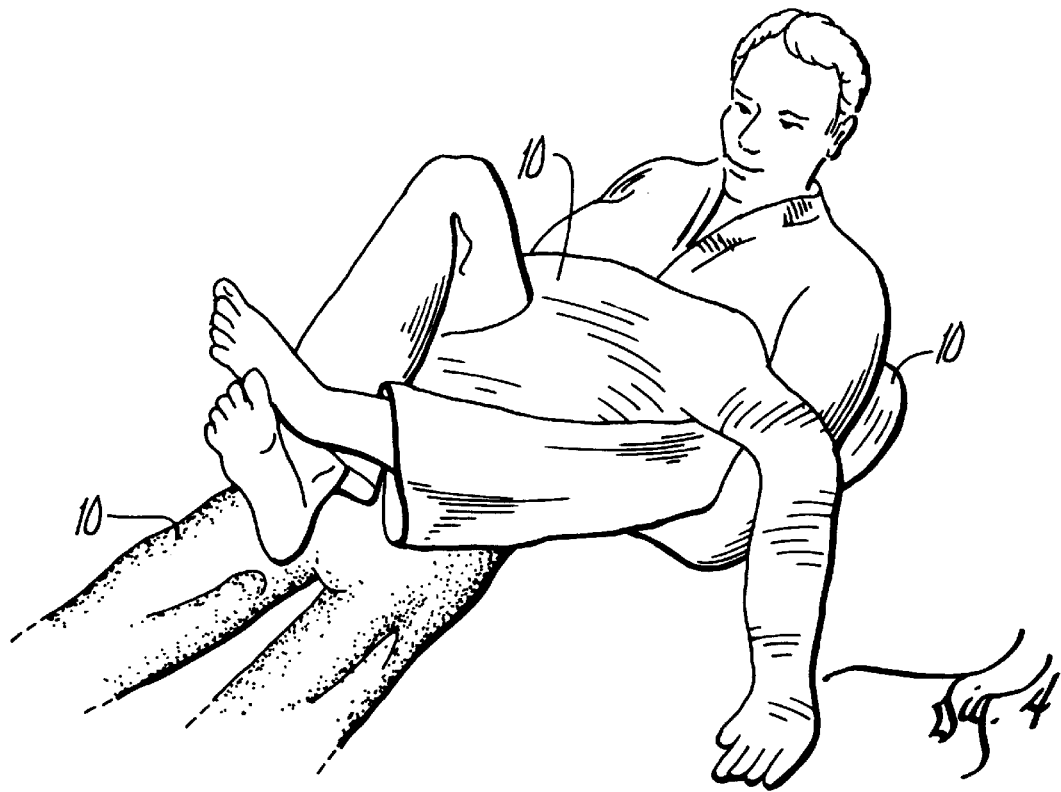
FIG. 4 is a comparable perspective view showing the user practicing a choke on the dummy from the guard position.

FIG. 4 shows the user practicing a choke on the dummy 10 from the guard position. This position is also a test position after production, to check if the neck is secured sufficiently against pulling out. In fact, the other extremities of the dummy 10 are comparably tested for strength against pulling out, and this includes the upper arm from the shoulder, the lower arm from the upper arm, the hand from the lower arm, the upper leg from the torso, the lower leg from the upper leg, the foot from the lower leg, and so on.

An inventive aspect of the grappling dummy 10 includes that, for a given stature—if it is given for example a stature of about five foot ten inches (178 cm) tall—then the weight of the grappling dummy 10 is correspondingly given a relatively diminutive weight:—e.g., somewhere in the neighborhood of forty pounds (18 kg) or so for the five foot ten inch stature. It has been discovered that giving the grappling dummy 10 such a relatively diminutive weight (relative to its stature) happens to just "feel" right to the user who is practicing or exercising with the dummy. In other words, whereas the grappling dummy 10 is given a proportionate height for a practice opponent, it is given a grossly diminutive weight. The stature of the dummy 10 is not limited to the example given above, as it can be scaled accordingly to larger and smaller sizes. In fact, versions of the grappling dummy 10 in accordance with the invention have been produced from between six foot (183 cm) and four foot (122 cm), which was produced to specification for a sub-adult user.

To achieve the strength needed in the construction of the dummy 10, as well as give it the feel of a mock opponent and conserve on weight, the dummy 10 is made from diverse soft materials which are wadded, stuffed, rolled and so on as will be more particularly described below, and lashed and girdled with straps and tape as also will be more particularly described below. Many of the materials used in the dummy 10 involve recycling of spent or waste materials such as newspaper, computer paper, and grocery sacks. More particularly, the materials preferred for the production of the dummy 10 essentially consist of the following:

paper (as newspaper and computer paper, used both in shredded and sheet form),
  plastic film (as waste grocery sacks),
  burlap (used both in sack and sheet format),
  garden hose,
  braided nylon rope,
  poly strapping,
  cellophane tape,
  duct tape,
  paperboard tube (ie, the spent cores of the tape rolls), and,
  eight lengths of pine 2×2's (eg., 5 cm on a side).

In some versions of the dummy 10, the head includes a core of a spent softball. Excluding the softball (if it used), the only truly stiff or hard materials are the eight pieces of wood. The wood is used in the limbs of the dummy 10 as upper and lower arm and leg shafts. The eight shaft or limb members aside, the remainder of the dummy 10 is fabricated from all the other soft materials given by the list. Indeed, the dummy 10 is entirely held together by lashing or knotting of the burlap or rope or poly strapping, or by wraps of either forms of the tape.

To turn now to FIG. 5, it shows production of the head 20 of the dummy. There are several ways to make the head. One way is to start with a spent softball 22 (which is optional), place it inside a small burlap sack 24, and stuff the sack tightly with rolled or wadded paper or plastic film (not in view). It is preferred if the head 20 is constructed relatively firm.

Another way to make the head begins with a tight roll or wad of paper (this is not shown) covered with an outer sheet of burlap that has poly strap and rope placed on the inside of the burlap sheet. The head is then covered in the burlap sheet and covered in tape. The tag ends of the poly strapping and the rope shall be used to lash the head to a bi-lateral arm structure 30, which is more fully described below.

If the head 20 is produced in the version of the burlap sack 24 and/or softball 22 (see FIG. 5), it should be covered with a meshing of criss-crossing loops of poly strapping 26 and braided rope, whose tag ends 26 extend out free of the loose folds 24' surrounding the sack opening in what will become the neck. The burlap layer 24 except for the skirt portion 24' is wrapped in duct tape 27. A neck is created from a tube 28 formed from joining two centers of spent tape rolls. These are flexed and wrapped or otherwise distressed to weaken or soften the paperboard tubing 28. The excess 24' of the burlap sack 24 about its opening is gathered with the tag ends of the strapping 26 and rope, and inserted though the neck tube 28 to flare out the other side like a skirt. The tag ends of the poly strapping and the rope shall be used to lash the head 20 to the bi-lateral arm assembly, which is also shown by FIG. 5 (and FIG. 6 as well). A chin, nose and ears may be added by taping on wads of plastic shopping sacks which are formed as appropriate.

To begin now with the production of the arms, the arms are completed partially as a bi-lateral assembly 30. As a preliminary matter, the construction of the arms by means of a bi-lateral assembly 30 is very similar to how the legs are constructed. Also, the arms and legs are produced very nearly the same way in terms of use of upper- and lower-wooden limb members, as well as that the elbows and knees are constructed substantially the same way, all which will be described more particularly below in connection with either the arms or legs or both, whichever the particular case may be, as representative of the other of the legs or arms when only one is described.

To return to the bi-lateral assembly 30, it is a bundle of flexible filaments that preferably comprise as many strands as three strands of garden hose 31, two strands of braided nylon rope 32, and two or four or more strands of poly strapping 33. These flexible filaments 30 extend between opposite tag ends which correspond to the left and right wrists of the completed dummy. The bundle 30 has a central portion 34 which is wrapped in cellophane tape to hold the strands 31–33 together. The head 20 is shown situated next to the center 34 of the flexible filaments 31–33 for fastening thereto.

FIG. 6 shows the head 20 lashed and taped to the center 34 of the flexible filaments 31–33. The tag ends of the ropes and poly strapping 26 that cradle the head 20 (e.g. see FIG. 5) are lashed around the bundle 30's center 34, and the burlap skirt 24' is wrapped and taped in place as shown.

Figure 7:
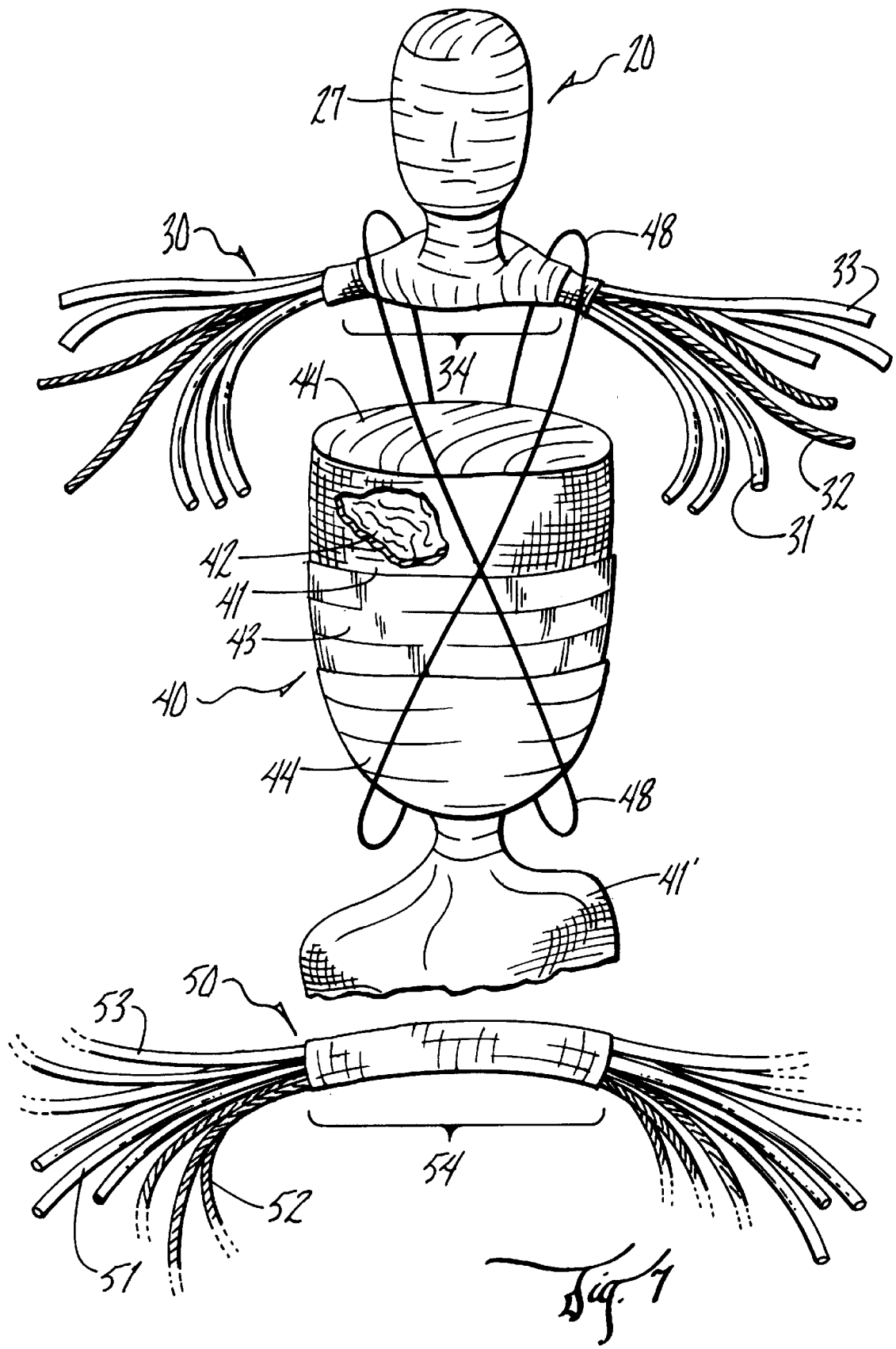
FIG. 7 is a perspective view comparable to FIG. 5 except showing the production of the torso of the dummy and a bi-lateral leg assembly which is highly similar to the bi-lateral arm assembly, as well as showing the head and arm assembly of FIG. 6 in preparation for joining together the head, arms, torso and legs into one assembly, wherein layers of the torso are partly peeled off to show the composition of the torso.

FIG. 7 shows production of a torso 40 for the grappling dummy 10. The torso 40 comprises two burlap sacks 41 stuffed firmly with shredded paper 42, and wrapped in cellophane tape 43 and duct tape 44 on top of that.

Indeed, the torso 40 is much like a conventional punching bag found in boxing gyms. That is, it has a fabric liner filled tightly with a soft stuffing.

Those similarities aside, preferably here the torso 40 is not only stuffed tight but also compressed tighter by the respective layer windings of the cellophane 43 and duct tape 44 until the torso 40 as whole is "turgid," or more simply, semi-rigid. The head 20 is produced with the same characteristics, ie., a punching bag in miniature. That way, the torso 40 (as well as the head 20) provides a soft surface to punch or kick against to protect the user from punishing his or her hand too much while at the same time being firm enough to simulate the feel of impact against an actual opponent.

The excess burlap 41' that flares out from the bottom or "crotch" area is used to secure a bi-lateral leg assembly 50 to the torso 40. The bi-lateral leg assembly 50 comprises a composite or bundle of flexible filaments 51–53 comparable to the bundle 31–33 of the bi-lateral arm assembly 30, as previously described in connection with FIGS. 5 and 6. That is, preferably there are about three strands of garden hose 51, two strands of braided nylon rope 52, and two or four or more strands 53 of poly strapping.

FIG. 7 also shows how the head/arm assembly 20/30 as well as the bi-lateral leg assembly 50, are lashed together with the torso 40 therebetween. The lashing is accomplished by twin strands 48 of poly strapping looped around about three times. The burlap skirt 41' that extends out from the base or "crotch" of the torso 40, is rolled around the center 54 of the flexible filaments 51–53 of the leg assembly 50, and is wrapped in duct tape (not shown) thereafter to secure things.

Figure 8:
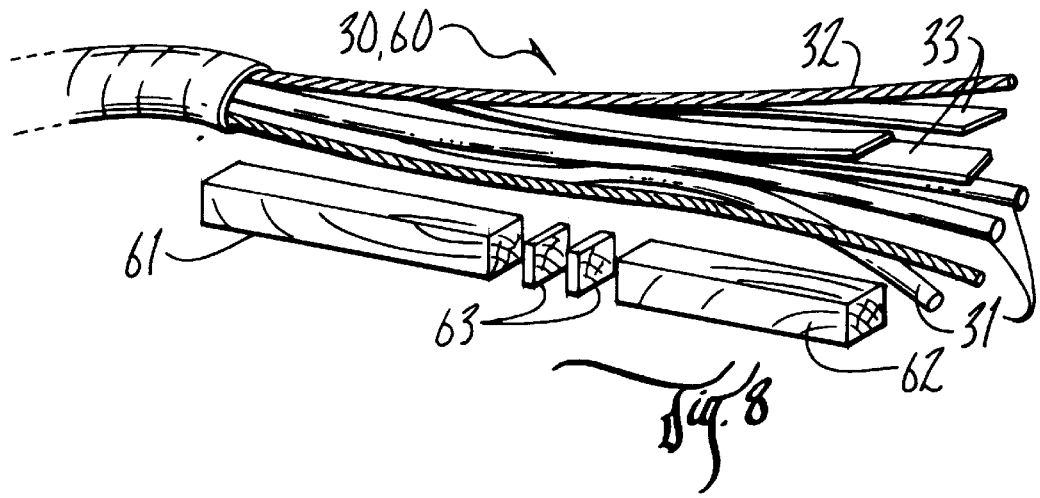

FIG. 8 shows wooden shafts 61 and 62 are put to use in the production of the left arm 60 (and as representative of how the right arm as well as how both legs of the dummy are constructed). The wood stock material in the dummy is limited to use for upper and lower limbs only in the arms and legs. That is, each of the upper and lower arms and legs are built around wooden shafts giving them sufficient stiffness like bones. A single eight foot long (2.4 m) length of a pine 2×2 (5 cm×5 cm) is all that is needed, it being sectioned into eight pieces, namely two upper arm pieces, two lower arm pieces, two upper leg pieces, and two lower leg pieces.

FIG. 8 shows one set of an upper arm piece 61 and a lower arm piece 62. In order that the dummy have proportionate arms for a final stature of about five foot ten inches (178 cm), it is preferred if each of the upper piece 61 measures about nine inches long (23 cm), and the lower arm piece 62 measures about ten inches long (25 cm). In order that the dummy will have a final stature of about five foot ten inches (178 cm), the upper leg piece (not shown) preferably measures about twelve inches long (30 cm) while the lower leg piece (also not shown) preferably measures about seventeen inches long (43 cm). The lower extremities of the lower arm piece 62 and lower leg piece (not shown) are tapered down by half or more so that when the wrists and ankles are "fleshed" out they will have respective measurements of seven inches (18 cm) and nine inches (23 cm) in circumference.

To resume in FIG. 8, it shows the upper arm piece 61 and lower arm piece 62 spaced apart by two spacers 63 which when combined will give a total of 1¾ inches (45 mm) shim spacing (the knee joints get shim spacing of just ¾-inch (19 mm)). The spacers 63 are used temporarily and are removed after a certain stage in the assembly (their removal is more fully described below) in order to give an elbow joint (ie., indicated generally as 64 in FIG. 9) a pre-determined range of articulation as will be described. To begin production of the arm 60, the wooden arm components 61–63 of FIG. 8 are wrapped together end-to-end as shown set-up in FIG. 8, to form of one long shaft (this is not shown) in cellophane tape.

As best shown by FIG. 8, the flexible filaments 31–33 which compose the bi-lateral arm bundle 30 include three lengths of flexible garden hose 31, two lengths of braided nylon rope 32, and multiple (eg., four or more) strands of poly strapping 33.

Figure 9:
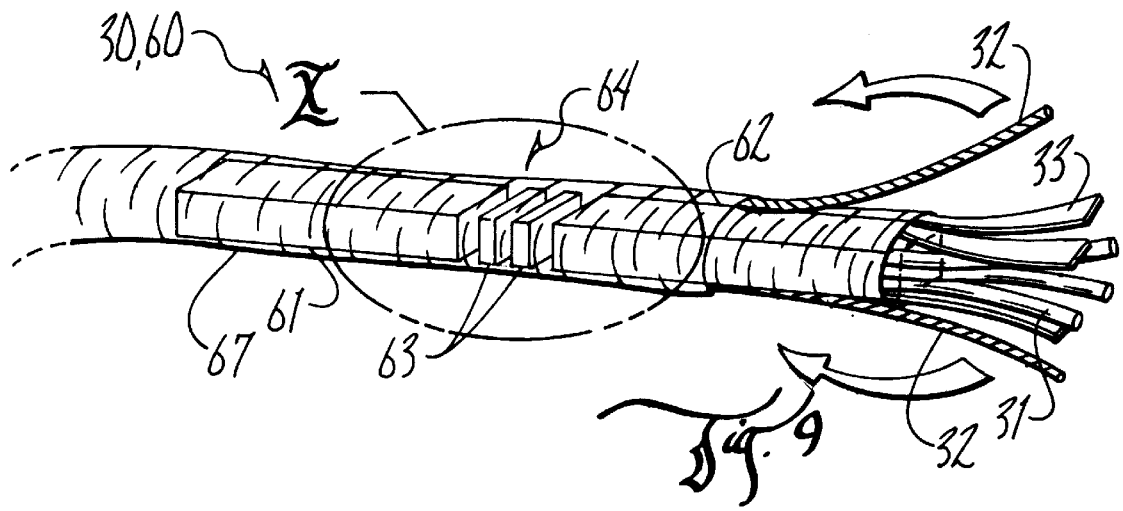

FIG. 9 shows assembly of the stiff wooden components 61–63 of the arm 60 to portions of the flexible filaments 31–32. The taped-together wood pieces 61–63 of FIG. 8 were set beside the flexible filaments 31–33 of FIGS. 5 or 6 (i.e., the composite bundle 30 of hose, rope and strapping), and the combination of the wooden components 61–63 and the flexible filaments 31–33 have all been wrapped together inside a sheath 67 of cellophane tape.

Figure 10:
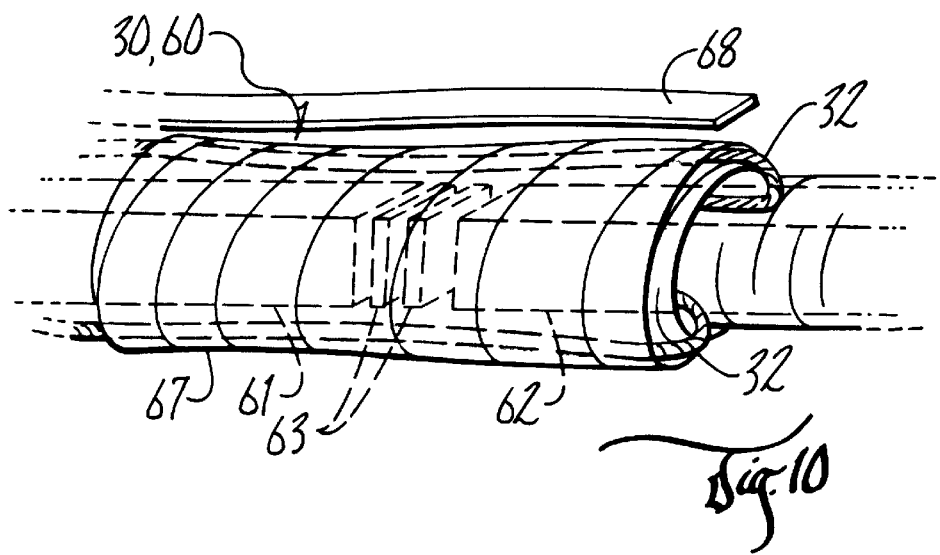

FIG. 10 shows on an enlarged scale view of the elbow 64 of FIG. 9. The nylon braided rope 32 has been folded to return up the arm 60 and is wrapped in the sheath of tape 67. Securing the braided rope 32 like that holds the lower-arm piece 62 in place better and better resists the joint 64 from tearing apart. Also, the joint 64 is preferably further reinforced against pulling apart with three lengths of poly strap extending lengthwise across the joint (only one is shown and is indicated as 68), each of which is wrapped separately in tape to prevent pull-out in unison.

An optional step includes application of a fifteen ply (or sheets) wrap of newspaper wrapped around the upper arm one or more times (this is not shown). The lower limit of the newspaper wrap would be about the termination of the upper arm piece 61. Accordingly, the newspaper wrap would form a flange of newspaper which would extend into the center of the elbow joint 64 and would be unsupported by the wooden upper arm 61. Similarly, there would be a comparable application of a fifteen ply (or sheets) wrap of newspaper wrapped around portions of the lower arm 62 one or more times. The newspaper wrap would form a band about four-and-one-half inches (11 cm) wide. The upper limit of the newspaper wrap would be the center of the elbow joint 64. After the newspaper layer would have been applied, then preferably the tag ends of the braided rope 62 (compare FIG. 9 with FIG. 10) which would have extended out loose from the lower limit of the lower arm 62's newspaper wrap, would be un-braided and folded back onto the outside of the newspaper wrap and wrapped securely in the sheath 67 of tape. Thus, by securing of the braided rope in this fashion, the arm 60 should be sufficiently resistant to pulling out of the torso 40 during use or practice with the dummy.

FIG. 11 shows the process for permanent removal of the temporary spacers 63 in the elbow 64. The tape wrap 68 has been cut with a box cutter around ¾ths the periphery of the elbow joint 64, and then the elbow joint 64 is bent to snap open. As shown, the elbow 64 is flexed like a hinge joint. The temporary spacers 63 are accessible after cutting open the elbow joint 64 and flexing it open, for permanent removal. In fact, FIG. 11 shows the elbow joint 64 after removal of the temporary spacers 63. Tape is applied over the exposed wooden ends in the elbow joint 64 (this tape is not shown).

Removal of the spacers 63 leaves behind a gap or cavity between the ends of the wood pieces as shown in FIG. 11. FIG. 12 shows that the open elbow cavity of FIG. 11 is stuffed tightly with wadded plastic sack material 69. The plastic sack material 69 fills the cavity to the extent that it stops the wood shafts 61 and 62 from extending past a straight alignment, or what would be "anatomically speaking" a hyper-extended alignment in the elbow joint 64.

FIG. 13 shows a "resistor" 70 for the elbow. The resistor 70 is a folded sheet of burlap that forms several plies of burlap layers. The resistor 70's center section is covered by a band of duct tape 72. The resistor is applied to cover the open elbow joint 64, as better shown by FIG. 14. The resistor 70 is wrapped tightly with tape 75 at both one half-portion which overlaps the upper arm 61 as well as its half-portion which overlaps the lower arm 62. The resistor 70 serves several purposes. The resistor 70 constrains the elbow joint 64 to articulate substantially in extension and flexion only (eg., hinge movement as indicated by arrows 73 in FIG. 13). The resistor 70 prevents "twisting" and the like, or in more technical terms of the discipline of anatomy, the resistor 70 substantially prevents circumduction, rotation, abduction and adduction and the like. The resistor 70 also provides some resistance to the flexion and extension of the elbow 64 as it flexes and extends within its imposed limits, so that the lower arm 64 doesn't just swing loosely like some broken chicken wing. The same sized resistor 70 that is applied to the elbow 64 is also applied to the ankle. A comparable resistor is applied to the knee, but it is produced on an enlarged relative to the resistor 70 used on the elbow 64. Another resistor 80 is applied to the hips area as will be shown and described in connection with FIG. 15.

FIG. 14 shows the elbow resistor 70 wrapped in tape 75 to hold it in place. Preferably the arm 60 is pre-set by the tape wrap 75 in a given state of flexion (as shown in FIG. 14, and also see, eg., FIG. 3), which state of flexion will approximately be the at-rest state of flexion for the completed dummy 10.

Experience teaches that the resistors (eg., one being indicated as 70) are so successful at stiffening the joints that the joints require "limbering" work to get them to work as preferred. In production, the joints including without limitation the elbow 64 are "distressed" or subjected to a "breaking in" process to soften the inherent stiffness of the resistor 70. To do this, the elbow 64 would alternatively be clamped to hold it in place in an extreme flexed position (this is not shown), and then un-clamped to be re-clamped in an extreme extended position (in fact both arms are done together in an outstretched position on a stretch rack). This step is repeated twice, first after the elbow 64 has been completed to the stage shown by FIG. 14, and a second time after padding has been added to the point of the elbow 64 (not shown). The same twice-applied "breaking in" process is performed on the knees as well. In fact, it is recommended to users of the dummy 10 that they loosen up the joints before each practice by bending the arms and legs a few times before each practice session (especially in cold weather). The instructions for new owners also alerts them to the fact that the body will make a few noises as the tape settles.

A substantial inventive aspect of grappling dummy 10 in accordance with its production, is the following. The joints of the dummy (in particular, the elbow, knee, hip and ankle joints) all hold their angle of articulation until a sufficient applied forces flexes or extends them to a changed position, after which the involved joint will tend to hold in that changed position. In this respect, the dummy 10 in accordance with the invention behaves like an enlarged scale version of the Gumby® doll.

As best understood, the Gumby® doll had a soft "gummy" body (presumably neoprene) covering a wire stick-skeleton. The Gumby® dolls outside skin of neoprene was pliable in one's hand. If the Gumby® doll's limbs were flexed, the malleability of the wire stick-skeleton would hold the limbs in any position they might be twisted up into. The dummy 10 in accordance with the invention will not allow nearly as much contortion as the Gumby® doll. However, the dummy 10's joints do have that same characteristic of holding their position until an applied force overcomes them, after which the joints will hold the new position that follows after the applied force is released.

Therefore, in more technical language, the joints behave as if they feature a preset drag. An applied force sufficient to overcome the preset drag is needed to move a joint. After the applied force falls below the preset drag, the joint "freezes" in place.

The processes at work with the dummy 10 which cause the foregoing effect involve the interplay of numerous complex factors. It is reckoned that movement in any joint requires that multiple overlapping windings of tape wrap must shift relative to each other, and/or layers or billows of wadded or rolled paper or plastic-film must shift relative to each other. To consider another aspect of joint movement, let's isolate on the resistor. The resistor is held by tape in one position, and in order to change shape to a second position the resistor must either slip past the frictional grabbing of the tape or alternatively drag the tape with it and thereby induce deformation in the tape (or perhaps cause both effects). And so on with the other soft components of the dummy.

The point is, that the dummy 10—unlike the Gumby® doll—is not produced from homogenous soft tissue (eg., neoprene in the Gumby® doll) surrounding a malleable skeleton. In the dummy 10, the only skeletal components are the wooden shafts (eg., 61 or 62), and they do not span across any joint. It is the dummy 10's soft tissue which affects and controls all the behavior of the joints. Hence it is reckoned that composite nature of the dummy 10's soft tissue is attributable for the desirable actions in the joints.

What follows is a listing of some of the factors involved and which interplay with each other to give the joints of the dummy 10 their desirable actions. Thus:

the nylon braided rope and poly strapping are optimal for carrying tensile loads but otherwise are as limp as noodles to bending, the resilient hose is resistant to bending and its resistance increases with the angle of the bend (until, that is, the hose buckles or dimples), parallel runs of the hose are resistant to torsional deformation, tightly compressed soft stuffing such as paper or plastic film wadded into a sack or other confining cavity, is resistant to compressive and shear deformation, the cellophane and/or duct tape wrap is advantageous for maintaining compression, overlapping windings of tape wrap also resistant to shear, a spiral sleeve of tape windings is resistant to bending and torsional deformation, the adhesive contact of tape on tape probably allows no frictional slipping although the tape does stretch a little bit, the adhesive contact of tape on burlap probably allows significantly more frictional slipping, and so on.

To merely be able to identify some of the factors involved (and perhaps to be overly inclusive in some instance) is not to be able to describe perfectly the processes at work in the action of the joints. What is know about the joints is what trial and error has taught. Constructing the dummy 10 as described herein produces an advantageous mock opponent.

The dummy 10 can nearly stand balanced on its own when its ankles, knees and hips are flexed into certain positions. The standing dummy 10 can partly carry the weight of the user leaning into the dummy 10 as like leaning onto a live opponent. In brief, the dummy 10 is no inert punching bag nor a rag doll. It has "muscle" on its own to provide adequate resistance to the moves of a user to provide the user with a meaningful exercise routine for the practice of skills as well as conditioning.

To return now to steps in the production of the dummy 10, the point of the elbow 64 is preferably cushioned in padding (not shown) for the sake of protecting the user/exerciser, who otherwise is at some risk of poking him or herself in his or her own soft places while exercising with the completed grappling dummy. The cushioning comprises multiple layers, such as, a plastic film sack folded into a square and placed on the elbow point. Another plastic film sack is wound around for stability. And then a plastic film sack rolled into the size of a thumb is used for the actual elbow point.

FIG. 15 is a perspective view of the hip area 82 of the dummy and showing the application of one resistor 80 to each hip 84 to constrain the articulation of the hip 84 substantially to flexion and extension only (eg., hinge movement), to limit unnatural hyper-extension of the hip joint 84, and to give resistance to the flexion and extension of the hip 84 within the imposed limits of extension and flexion. Each resistor 80 is formed from folded burlap which is duct taped and applied to the dummy in FIG. 15 by lapping half or so of the resistor 80 partly onto the upper leg 85 and the other half partly onto the lower torso 40. The resistors are secured by wraps of duct tape.

The resistor 80 thus constrains the upper leg 85 to articulate substantially in flexion and extension only, and not allowing circumduction, rotation, abduction or adduction. Also, the resistor 80 helps prevent the upper leg 85 from hyper-extending backwards unnaturally. Without the resistors 80, the legs would not "stand" on their own, to the extent that they do and as shown by FIG. 1. The resistors 80 do allow, however, that the knees can be pushed into the chest of the dummy 10.

FIG. 16 shows one version of constructing a hand 90. With reference back to FIG. 9, the left arm 60 terminates in the tag ends of garden hose 31 and poly strapping 33 after the nylon rope 32 has been bent back. Preferably the tag ends of the garden hose 31 are shaved in half for the last three inches (7.5 cm). The hand 90 in FIG. 16 is built from five pieces of hose 91, rested side-by-side, and which have wrist portions shaved in half and taped onto the termination of the arm 60. Each hose 91 that corresponds to a finger is given a wrap of plastic film material around the root where it protrudes from the wrist for about four-and-one-half inches (11.4 cm) its extent. The four tag ends of the poly strapping from the arm are available for lashing the fingers and thumb 91 of the hand 90 to the arm 60. Two of the poly strapping tag ends (not in view in FIG. 16) are used to secure the thumb alone, as the remaining two are used to secure the remaining four-finger portion of the hand 90.

FIG. 17 shows an alternate version of a hand 92. It comprises a thumb 93, an index finger 94, and pinkie finger 95 made of lengths the braided nylon rope instead of garden hose. The meta-carpal articulations 96 are built-up with tape and a wrap of plastic film sack material to give things the desired proportions. The hand 92 is anchored on to the associated arm (not in view) by means of the poly strap tag ends from the arm assembly 30 as lashed and tightened in place, and taped over afterwards.

FIG. 18 shows matters how a foot assembly 105 is constructed. The garden hoses 51 which are part of the flexible filaments that form the bi-lateral leg assembly 50 (e.g., see FIG. 7), have tag ends 151 which extend out and form a lowest course 111 of hose to make the foot 105. Those three tag ends 151 are flanked by a half-loop of hose 107 which encircles the heel portion, and rests against the three tag ends 151 as shown as indicated by arrows 109. Hence the three tag ends 151 and the two prongs 107' of the half-loop 107 make up the bottom course 111 of five hoses. A second course 112 overlays the bottom course 111 and it comprises four side-by-side stubs of hose. And indeed, a third course 113 overlays the second course 112 and the third course 113 comprises three side-by-side stubs of hose. The seven total stub ends of the second and third course 112 and 113 of hose are jammed under the end 161' of the wooden leg member 161. These seven hose ends (ie, of courses 112 and 113) give the ankle 115 a bias toward plantar flexion. The bias toward plantar flexion is balanced by the taping on of a resistor 118 across the ankle joint 115, as shown and as indicated by arrows 119, to hold the ankle 115 when relaxed in a given angle of flexion (eg., nearly as shown). The foot 105 would also include a heel built from wadded plastic sack material (not shown).

The resistor 118 for the ankle 115 preferably is reinforced by three or so lengths of hose lying on top of it (these reinforcing hoses are not shown). The resistor 118 and reinforcing hose would cooperatively limit flexion of the ankle 118 substantially to hinge-joint movement and within a restricted range of flexion between plantar and dorsal extremes. The bias towards plantar flexion as provided by the seven hose ends (ie, of the second and third courses 112 and 113) and the resistance thereto provided by the resistor 118 practically allows the dummy 10 to be balanced standing on its own without external propping as by the user or by whatever else. It also gives the ankle 115 a springiness as if it had lifelike agility when the dummy as a whole is leaned onto by a user. The ankle resistor 118 would also limit the plantar flexion of the ankle to facilitate the practice of maneuvers such as foot locks and the like.

For cosmetic purposes, the arms and legs of the dummy can be "fleshed" out with material such as wadded plastic film or the like, in order to give the arm or leg more realistic proportions. The preferred material is the plastic film material of grocery sacks and the like because it is relatively solid when wadded as well as lightweight, but adds less mass to the completed dummy than many other materials. In case where much more massive build-up is needed, it can be achieved with multi-ply wraps of newspaper. For example, the upper leg (eg., thigh) will comprise about two 30-ply layers of newspaper wrapped directly onto the upper leg before attachment of the lower portion of the resistor. Added on over that are two more 30-ply layers. Each 30-ply layer comprises 30 sheets, and so four 30-ply layers comprises 120 sheets of newspaper wrapped around the thigh. Altogether, that will give the thigh a final circumference close to about sixteen inches (40 cm). These 30-ply layers are added onto the legs to give them more realistic proportions and hence remove an unsightly spindly look to the legs.

Also for cosmetic purposes, a chin, nose, and ears can be added by taping on wads of plastic shopping sacks, formed as appropriate. The dummy can be given a skin of some stretchy material like Spandex™ or the like. It can also be dressed for modesty in at least trousers, or else in the uniform of the given sport, say for example in a Kimono for practice where grabbing the robe to throw the opponent is part of the exercise routine for the user.

The aforementioned U.S. Provisional Application No. 60/051,050, filed Jun. 27, 1997, includes further views of the subject matter of the invention hereof, and its disclosure as a whole including its accompanying description for the views is incorporated fully herein by this reference to it.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A grappling dummy comprising:
    a torso having a semi-rigid abdominal wall extending between upper and lower ends;
    a bi-lateral arm assembly;
    a bi-lateral leg assembly;
    each of the bi-lateral arm and leg assemblies comprising:
        a bundle of flexible strand elements,
        generally rigid left and right upper-limb members disposed on the bundle flanking a gap that defines one of a shoulder portion and a hip portion therebetween correspondingly for the arm assembly and leg assembly, respectively,
        generally rigid left and right lower-limb members disposed on the bundle flanking the left and right upper-limb members, respectively, and respectively defining therebetween correspondingly for the arm assembly and leg assembly, left and right elbow joints and knee joints, respectively,
        attaching means for attaching the upper- and lower-limb members to the bundle between various strands thereof and allowing relative movement in the respective elbow or knee joint,
        resistor means associated with each elbow or knee joint for limiting the articulation in the associated elbow or knee joint substantially to flexion and extension only, and providing frictional resistance to the flexion and extension movements of the associated elbow or knee joint, and,
        stop means associated with each elbow or knee joint for stopping extension movement in the associated elbow or knee joint at a given limit that corresponds to hyper-extension thereof;
    arm assembly mounting means for mounting the shoulder portion thereof to the upper end of the torso and allowing movement at left and right shoulder joints thereof;
    leg assembly mounting means for mounting the hip portion thereof to the lower end of the torso and allowing movement at left and right hip joints thereof; and,
    hip resistor means associated with each hip joint for limiting the articulation in the associated hip joint substantially to flexion and extension only, and providing frictional resistance to the flexion and extension movements of the associated hip joint.

2. The grappling dummy of claim 1 wherein the hip resistor means further comprises stop means for stopping extension movement in the associated hip joint at a given limit that corresponds to hyper-extension thereof.

3. The grappling dummy of claim 1 wherein the torso comprises a fabric liner that is filled tightly with a soft stuffing.

4. The grappling dummy of claim 1 wherein some of the flexible strand elements are chosen from a group comprising flexible hose, braided rope, and poly strapping.

5. The grappling dummy of claim 1 wherein the generally rigid upper- and lower-limb members comprise wood shafts.

6. The grappling dummy of claim 5 wherein the stop means comprises a filler material placed between proximate shaft ends of the respective upper- and lower-limb members to jam and stop any further extension therebetween at the given limit.

7. The grappling dummy of claim 1 wherein the attaching means comprises one of cellophane tape and duct tape.

8. The grappling dummy of claim 1 wherein the resistor means associated with the elbow or knee joints comprises a fabric sheet folded to form multiple plies.

9. The grappling dummy of claim 1 wherein one of the arm assembly mounting means and the leg assembly mounting means comprises lashing and tape.

10. A grappling dummy comprising:
    a semi-rigid torso having an abdominal wall extending between upper and lower ends;
    left and right arms anchored in left and right margins of the torso's upper end;
    left and right legs, each leg comprising:
        a plurality of filaments extending from an origin anchored in the torso at the lower end thereof, to spaced tag ends;
        a generally rigid upper-leg member disposed on the plurality of filaments spaced from the torso to define a hip joint,
        a generally rigid lower-leg member disposed on the plurality of filaments spaced from the upper-leg member to define a knee joint,
        attaching means for attaching the upper- and lower-leg members to the plurality of filaments and allowing relative movement in the respective hip or knee joints thereof,
        resistor means associated with each hip and knee joint for limiting the articulation in the associated hip or knee joint substantially to flexion and extension only, and providing frictional resistance to the flexion and extension movements of the associated hip or knee joint, and,
        stop means associated with each knee joint for stopping extension movement in the associated knee joint at a given limit that corresponds to hyper-extension thereof;
    wherein the resistor means includes preset drag means for limiting the articulation in the associated joint to instances when a force is applied to the associated joint sufficient to overcome the preset drag, and after the applied force falls below the preset drag the associated joint generally freezes in place.

11. The grappling dummy of claim 10 wherein each arm comprises:
    a plurality of filaments extending from an origin anchored in the torso at the upper end thereof, to spaced tag ends;
    a generally rigid upper-arm member disposed on the plurality of filaments spaced from the torso to define a shoulder joint,
    a generally rigid lower-arm member disposed on the plurality of filaments spaced from the upper-leg member to define an elbow joint, attaching means for attaching the upper- and lower-arm members to the plurality of filaments and allowing relative movement in the respective shoulder or elbow joints thereof, resistor means associated with each elbow joint for limiting the articulation in the associated elbow joint substantially to flexion and extension only, and providing frictional resistance to the flexion and extension movements of the associated elbow joint, and, stop means associated with each elbow joint for stopping extension movement in the associated elbow joint at a given limit that corresponds to hyper-extension thereof;

wherein the resistor means includes preset drag means for limiting the articulation in the associated elbow joint to instances when a force is applied to the associated elbow joint sufficient to overcome the preset drag, and after the applied force falls below the preset drag the associated elbow joint generally freezes in place.

12. The grappling dummy of claim 11 wherein the filaments of each arm are continuations of one same bundle of filaments spanning across the torso from arm to arm.

13. The grappling dummy of claim 10 wherein the filaments of each leg are continuations of one same bundle of filaments spanning across the torso from leg to leg.

14. The grappling dummy of claim 10 wherein the resistor means associated with each hip further comprises stop means for stopping extension movement in the associated hip joint at a given limit that corresponds to hyper-extension thereof.

15. The grappling dummy of claim 10 wherein some of the filaments are chosen from a group comprising flexible hose, braided rope, and poly strapping.

16. The grappling dummy of claim 10 wherein the resistor means associated with the elbow or knee joints comprises a fabric sheet folded to form multiple plies and attached by windings of tape wrap.

17. A grappling dummy comprising:
a punching bag torso extending between upper and lower ends;
left and right arms anchored in left and right margins of the torso's upper end;
left and right legs anchored in left and right margins of the torso's lower end;
each arm and leg comprising:
a filament extending from an origin anchored in the torso to a spaced tag end;
a generally rigid upper-limb member disposed on the filament proximate the torso;
a generally rigid lower-limb member disposed on the filament spaced from the upper-limb member to define a mid-limb joint,
attaching means for attaching the upper- and lower-leg members to the filament and allowing relative movement in the mid-limb joint,
resistor means associated with the mid-limb joint for limiting the articulation in the mid-limb joint substantially to flexion and extension only, and providing frictional resistance to the flexion and extension movements of the mid-limb joint, and,
stop means associated with the mid-limb joint for stopping extension movement at a given limit that corresponds to hyper-extension thereof;

wherein the resistor means includes preset drag means for limiting the articulation in the mid-limb joint to instances when a force is applied to the mid-limb joint sufficient to overcome the preset drag, and after the applied force falls below the preset drag the mid-limb joint generally freezes in place.

18. The grappling dummy of claim 17 wherein the filament is chosen from one of a flexible filament and a resilient filament.

19. The grappling dummy of claim 17 wherein the attaching means comprises a winding of tape wrap forming a spiral sleeve around each of the upper-limb member and lower-limb member.

20. The grappling dummy of claim 19 wherein resistor means comprises a fabric sheet folded to form multiple plies, placed across the mid-limb joint to overlap onto adjacent margins of the upper- and lower-limb members, and attached in a winding of tape wrap.

* * * * *